United States Patent
Peisert et al.

(10) Patent No.: US 6,470,772 B2
(45) Date of Patent: Oct. 29, 2002

(54) METHOD FOR THE MANUFACTURING OF A SAW BLADE

(75) Inventors: Andreas Peisert, Stuttgart (DE); Roland Pollak, Runkel (DE)

(73) Assignee: C & E. Fein GmbH & Co. (DE)

( * ) Notice: Subject to any disclaimer, the term of this patent is extended or adjusted under 35 U.S.C. 154(b) by 0 days.

(21) Appl. No.: 09/894,385

(22) Filed: Jun. 28, 2001

(65) Prior Publication Data

US 2002/0026857 A1 Mar. 7, 2002

(30) Foreign Application Priority Data

Jul. 3, 2000 (DE) .......................... 100 32 297

(51) Int. Cl.$^7$ .............................. B23D 15/00
(52) U.S. Cl. ....................................... 76/112
(58) Field of Search ............... 76/112, 104.1, 76/101.1, DIG. 6, 115

(56) References Cited

U.S. PATENT DOCUMENTS

| | | | |
|---|---|---|---|
| 2,361,492 A | * 10/1944 | Pare | 76/112 X |
| 3,990,338 A | * 11/1976 | Wikner et al. | 76/112 X |
| 4,706,524 A | * 11/1987 | Fischer et al. | 76/112 X |
| 5,323,670 A | * 6/1994 | Dietz | 76/112 |
| 5,697,835 A | 12/1997 | Nitz et al. | |

FOREIGN PATENT DOCUMENTS

| | | | |
|---|---|---|---|
| DE | 82 746 | 6/1971 | |
| DE | 31 24 252 | 6/1981 | |
| DE | 3408944 | 3/1984 | |
| DE | 296 05 726 | 3/1996 | |
| DE | 297 21 475 | 5/1997 | |
| DE | 198 25 758 | 6/1998 | |
| RU | 1491630 | * 7/1989 | 76/112 |

* cited by examiner

Primary Examiner—Douglas D. Watts
(74) Attorney, Agent, or Firm—St. Onge Steward Johnston & Reens LLC

(57) ABSTRACT

A new saw blade and a method of manufacturing such a saw blade are disclosed. The saw blade is made from a hardenable steel sheet in one piece and comprises a plain cutting blade from which a cranked mounting part, having a central mounting opening, protrudes. To manufacture such saw blades, blanks are cut out from a hardenable steel sheet and subsequently deep-drawn to provide the cranked mounting part. The mounting openings may be produced by stamping, thereafter. A plurality of such blanks is stacked over each other and clamped in a fixture, subsequently annealed for recrystallization and austenization and quenched thereafter, to harden the blanks. Finally, saw teeth are provided along the outer edges of the cutting blades.

16 Claims, 1 Drawing Sheet

METHOD FOR THE MANUFACTURING OF A SAW BLADE

BACKGROUND OF THE INVENTION

The invention relates to the manufacturing of a saw blade, comprising a cutting blade, on which a cranked mounting part protruding with respect to said cutting blade is provided, in which a mounting opening for fastening on a motor shaft is provided.

The invention further relates to a saw blade, comprising a cutting blade on which a cranked mounting part protruding with respect to said cutting blade is provided, in which a mounting opening for fastening on a motor shaft is provided.

RELATED PRIOR ART

From DE 296 05 728 U1, such a saw blade and a method for the manufacturing of such are known. Such saw blades are particularly used in the connection with an oscillating drive, the motor shaft of which oscillates with high frequency around the longitudinal axis of the saw blade to accomplish special cutting tasks. As the mounting part is cranked, it is herewith ensured that no mounting elements protrude over the plane of the cutting blade.

With such saws, it is possible to saw particularly car body sheets and other sheets up to a sheet thickness of about 1 mm without problems, whereby a danger of injury is excluded due to the oscillating drive. Moreover, such saws are suitable to cut wood and plastic reinforced by glass fibers. The known saw blades consist of a plain, circle-shaped cutting blade, the center of which has a central mounting opening preferably with a polyhedral for positive fitting to the motor shaft.

According to DE 296 05 728 U1 mentioned at the outset, the saw blade is made of a plain circle-shaped cutting blade, which consists of hardened steel, e.g. of HSS steel, and of a centrally cranked mounting part, in which the receptacle opening is provided. The mounting part is welded onto the cutting blade with a circulating laser weld seam to reach a material-fit connection between cutting blade and mounting part.

It has turned out, however, that in spite of the laser welded connection between cutting blade and mounting part a sufficiently durable connection between both parts is not always guaranteed. For example, when the load is high, the mounting part may be detached from the cutting blade, so that the saw blade cannot be used any more.

SUMMARY OF THE INVENTION

It is therefore the object of the invention to avoid the disadvantages mentioned above and, in particular, to create a stable saw blade as mentioned at the outset which avoids the danger of detaching between cutting blade and mounting part.

Moreover, a suitable method for the manufacturing of such a saw blade shall be disclosed which allows a reliable and cost-effective manufacturing.

With reference to the method, the object of the invention is achieved, according to the invention, by a method comprising the following steps:

(a) cutting a blank out of hardenable steel sheet;
(b) forming said blank to produce the cranked mounting part;
(c) cutting out the mounting opening;
(d) stacking a plurality of blanks manufactured according to steps (a) to (c) and clamping in a fixture;
(e) heating said blanks f or austenization and subsequently quenching for hardening said blanks;
(f) annealing said blanks; and
(g) finish-machining, preferably polishing, said saw blades to produce saw teeth on its outer edges.

The object of the invention is further achieved by manufacturing the cutting blade and the mounting part in one piece from hardened steel, preferably of a rapid machining steel having the main alloy components tungsten, molybdenum, and cobalt.

The object of the invention is, in that way, completely achieved.

It has turned out, surprisingly, that it is possible to manufacture the cutting blade and the mounting part in one piece from hardened steel.

In the prior art, it had, generally, been assumed that such a saw blade had always to be manufactured from two parts, namely on the one hand from the plain cutting blade, which consists of hardened steel, and, on the other hand, from the cranked mounting part which h as been connected with the cut ting blade in a material-fit manner, e.g. by welding or bonding. The reason for this is that forming of such sheets, e.g. of HSS steel, which are difficult to form, has not been thought possible up to now.

According to the method according to the invention, it is now possible to manufacture the desired saw blade with a cranked mounting part in one piece from a hardenable steel sheet. By stacking a plurality of blanks after deep-drawing and cutting out the mounting openings and clamping the stack in a fixture, whereby e.g. blocks of approximately 100 to 200 blanks can be formed, a heat treatment can subsequently be performed leading to little warping of the blanks.

The saw blades manufactured in that way are distinguished by their distinctively improved mechanical stability in comparison to saw blades manufactured from two elements. In particular, the increased stiffness allows a better handling during cutting and sawing, particularly with free-hand creating of possibly straight cuts.

According to a preferred embodiment of the invention in step (d) adjacent blanks are separated from each other by inserting a washer therebetween.

Thus the blanks can be clamped together to form a solid block, thus yielding warp-free hardening thereafter.

Cutting out the blanks and cutting out the mounting openings is done preferably by stamping, so that a cost-effective working is reached.

Together with cutting out the mounting opening, in a preferred embodiment of the invention, also a rough-machining of the blanks on their outer edges, preferably by stamping, can be carried out.

This facilitates the later forming of the saw teeth on the outer edges.

Forming the blanks according to step (b) can be done by deep-drawing, pressing, bending, or hydraulic forming.

In this procedure, pressing, which is particularly suitable for forming of rotation symmetric parts, or deep-drawing are preferred.

Moreover, it is possible to heat the blanks for forming, so that strain-hardening during the forming process and an inclination to stress cracks connected therewith is prevented.

Deep-drawing blanks in cold state for forming of the cranked mounting parts is preferably done with a slow advance and with a high force of pressure to prevent cracks from being formed during and after the forming process.

In a preferred improvement of the method according to the invention, within 24 hours, preferably within 12 hours, even better, however, within 6 hours after forming the blanks, a recrystallization annealing of the blanks is started.

It has turned out that, in that manner, stress cracks can be avoided, which, otherwise, would occur already after one or two days due to aging processes after the previous forming.

In this procedure, cutting out of the mounting opening out of the mounting part which is preferably reached by stamping is also done, possibly directly after forming, to avoid stress cracks from being formed.

If hot forming is done, recrystallization annealing may be omitted.

The geometry of the cranking of the mounting part is preferably selected in such a way that the saw blades, for hardening and tempering, can be clamped together gap-free.

In that way, warping is kept very low during the hardening and tempering process.

According to a preferred improvement of the method according to the invention, the blanks, after the heat treatment, according to step (e) in a state still clamped together are finish-machined, preferably polished, in order to create the saw teeth in a cost-effective manner.

For the manufacturing of the saw blades, preferably a rapid machining steel is used, preferably having the main alloy components tungsten, molybdenum and cobalt, e.g. a HSS steel with the composition of 0.8 to 0.95 wt.-% C, 3.8 to 4.7 wt.-% Cr, 4.5 to 5.5 wt.-% Mo, 1.7 to 2.1 wt.-% V, 5.8 to 7 wt.-% W with rest Fe, whereby e.g. the alloy type 33 34.0 by BÖHLER STAHL Deutschland GmbH, Düsseldorf, can be used, which contains 0.87 wt.-% C, 4.3 wt.-% Cr, 5 wt.-% Mo, 1.9 wt.-% V, 6.4 wt.-% W with reminder Fe.

The blanks are preferably cut out of a sheet of a thickness of approximately 0.7 to 1.5 mm, preferably of a thickness of approximately 1 mm.

With such a thickness, the saw blade concerned is particularly suitable for use with an oscillating drive, which, with a high frequency of about 3000 to 25,000 oscillations per minute and a small horizontal-swing angle of about 0.5 to 6°, oscillates back and forth around the drive axis. In this procedure, the diameter of the saw blades concerned, which have preferably the shape of a circle or of the segment of a circle, is in a range of about 8 to 12 cm, preferably at about 10 cm.

Independent thereof, the saw blades according to the invention can also be used with a rotary drive, e.g. as circular saw blades, whereby, then, merely the saw teeth on the outer edges are suitably adjusted.

If the material mentioned above and the geometry mentioned above are used, it has turned out to be advantageous to recrystallize the blanks, after clamping in the device, first, for about 1.5 to 2.5 hours at a temperature of about 600 to 700° C., before an austenization for about 3 to 5 minutes in a temperature range of about 1020 to 1080° C. is carried out. Austenization preferably follows directly after recrystallization for reasons of costs.

Quenching for hardening is preferably performed in a salt bath at a temperature of about 500 to 550° C. Generally, however, also a quenching under air or in an oil bath are possible.

The following annealing process comprises preferably a first annealing at the secondary hardening maximum for about 1.5 to 2.5 hours at about 530 to 630° C., as well as a second annealing to a desired working hardness for about 1.5 to 2.5 hours at about 530 to 630° C., as well as a third annealing for relaxing for about 40 to 80 minutes at about 400 to 500° C.

The heat treatment steps are preferably conducted under a reducing gas atmosphere in order to prevent oxidization. For that purpose, e.g. a forming gas 95/5, i.e. a mixture of 95 vol.-% nitrogen and 5 vol.-% hydrogen, can be used.

The saw blades, according to another embodiment of the invention, are, respectively, surface-ground on their two outer surfaces and, if necessary, are finish-ground, if, according to the respective application, a good flatness is required.

However, in particular, if an oscillating drive is used, the surface-grinding can also be omitted.

It is to be understood that the features mentioned above and those yet to be explained below can be used not only in the respective combinations indicated, but also in other combinations or in isolation, without leaving the scope of the present invention.

BRIEF DESCRIPTION OF THE DRAWINGS

Further features and advantages of the invention can be taken from the following description of a preferred embodiment with reference to the drawings. In the drawings.

DESCRIPTION OF THE PREFERRED EMBODIMENT

Figure 1:
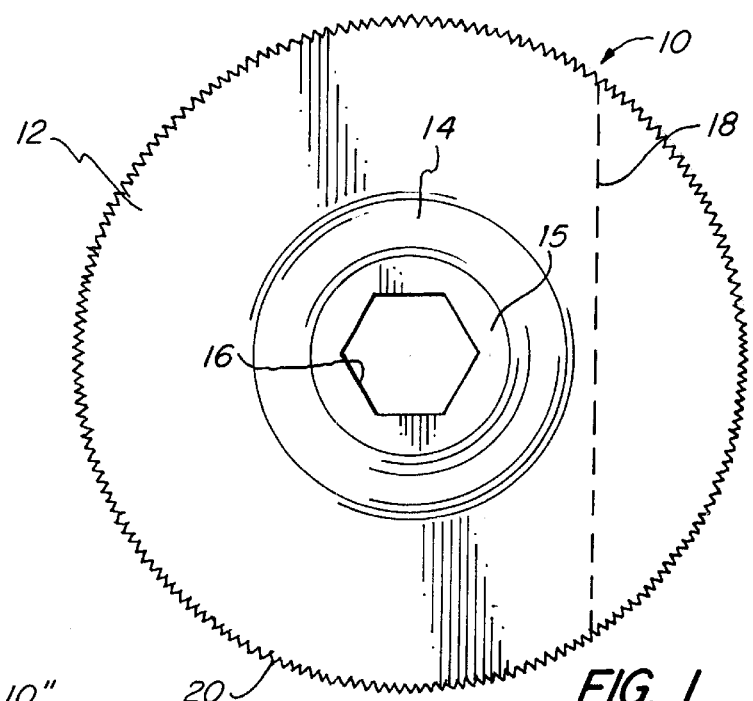
FIG. 1 shows a top view of a saw blade according to the invention.

In FIG. 1, a saw blade according to the invention shown in top view from above is designated altogether with the numeral 10.

Saw blade 10 is constructed in a circle-shaped manner and comprises a plain cutting blade 12, which is equipped, on its outer circumference, with a saw teething 20, and further comprises a central mounting part 14, which is cranked, and thus protrudes to the outside beyond the plane of cutting blade 12.

Figure 2:
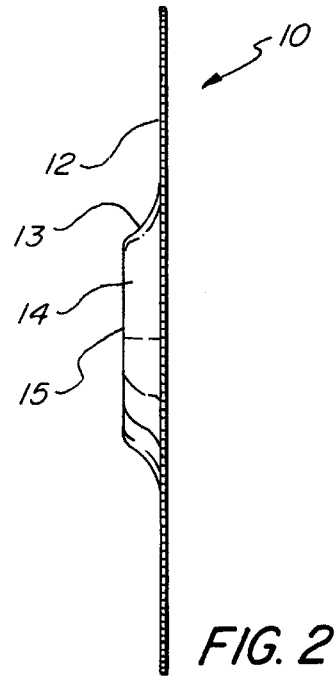
FIG. 2 shows a side view of the saw blade according to FIG. 1.

As can be seen from FIG. 2, mounting part 14 has a cranked wall section 13, which transits smoothly into the plane of cutting blade 12, and, to the center, opens into a receptacle plane 15, which is constructed in parallel to the plane of cutting blade 12. In this receptacle plane 15, a mounting opening 16 is provided, which can be preferably constructed as polyhedral, e.g. as hexagon, as shown, or as bihexagon, to allow a positive engaging with a motor shaft.

Saw blade 10 is manufactured, in one piece, of a tungsten-molybdenum rapid machining steel. In the embodiment shown, alloy type 33 43.0 S 600 of the company BÖHLER STAHL Deutschland GmbH, Düsseldorf, was used for the manufacturing of the saw blade. The saw blade has typically 0.87 wt.-% C, 4.3 wt.-% Cr, 5 wt.-% Mo, 1.9 wt.-% V, 6.4 wt.-% W with reminder Fe.

The manufacturing was carried out as follows:

Out of a raw sheet, circle-shaped blanks with a diameter of about 100 mm are stamped out. After that, in a hydraulic press, in cold state, mounting part 14 was deep-drawn with slow advance and high pressing force (approx. 600 tons). The diameter of cranked wall section 13 was about 50 mm, while the diameter of receptacle plane 15 was about 37 mm, and the distance of receptacle plane 15 (outer surface) from the outer surface of cutting blade 12 was about 4 to 5 mm.

After deep-drawing, central mounting opening 16 in the shape of a hexagon, without greater time delay, was stamped out with a stamping tool.

Figure 3:
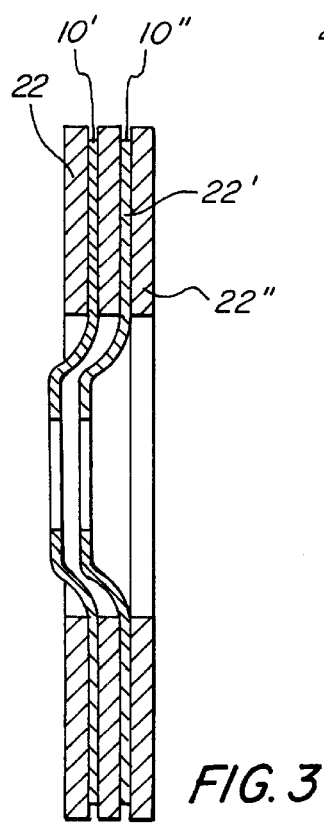
FIG. 3 shows a section of a stack of blanks which, having washers between adjacent ones, are clamped together to form a solid block.

In the following, approximately 100 to 200 of such blanks were stacked together while inserting washers 22, 22', 22" between adjacent blanks and were clamped together to a compact block in a fixture (hardening press), as shown merely for two blanks 10', 10" schematically in FIG. 3 (clamping fixture not shown). To this end, the shape of cranked wall section 13 was selected in such a way that the individual blanks could be clamped together gap-free.

In the following, the heat treatment of the blanks was started. First of all, the blanks clamped together were recrystallized for 2 hours at 650° C., then, within in the oven, cooled down nearly to room temperature. After that, an austenization was carried out, what was done with a first preheating step at about 500° C., with a short stop time of some minutes, and a second preheating step at 900° C., again with a stop time of some minutes, whereby, in the following, temperature was increased up to 1050° C. and was kept about four minutes, before the quenching process started. For a later series production, it is preferred to let the heating to the austenization temperature follow directly to the recrystallization without cooling in between.

Quenching was performed in a salt bath at about 500° C. to 550° C.

After appropriate cleaning, a first annealing process at the secondary hardness maximum for about 2 hours at 580° C. followed, after cooling to room temperature, a second annealing was performed, again with a holding time of 2 hours at about 580° C. After that, cooling to room temperature was performed and another annealing for relaxing was performed with a holding time of about one hour at 450° C. Thereafter, cooling to room temperature was effected.

Recrystallization annealing and austenization annealing were carried out under forming gas 95/5.

Recrystallization annealing was started, at the latest, approximately 6 to 12 hours after the deep-drawing process, so that forming of stress cracks in the region of the cranked wall section could be prevented.

After the third annealing and the following cooling to room temperature, on the outer circumference of the circle-shaped saw blades, in a state still clamped together, saw teeth 20 were created by grinding, whereby a cost-effective manufacturing was ensured.

The saw blades manufactured in that way were distinguished by good cutting features, in particular, when used with an oscillation drive. Problems with similar saw blades according to the prior art, which consisted of two parts connected with each other, that occurred because the mounting part was detached from the cutting blade, were completely avoided.

It is to be understood that such cutting blades can also be manufactured from hardenable steels of different composition, preferably from HSS steels, also in other dimensions, if the heat treatment parameters are adjusted accordingly.

It is further to be understood that besides of the manufacturing of circle-shaped saw blades also a manufacturing of differently shaped saw blades is possible. Apart from saw blades in the shape of a circle segment indicated e.g. by secant 18 in FIG. 1, also special forms which are not represented in the drawings, can be manufactured.

Finally, such saw blades are generally also applicable in connection with rotary drives, i.e. for example as circular saw blades, if the saw teeth are adjusted correspondingly.

What is claimed is:

1. A method for manufacturing a saw blade, having a cutting blade, on which a cranked mounting part protruding beyond the cutting blade is provided, the mounting part having a mounting opening for fastening on a motor shaft, said method comprising the following steps:

(a) cutting a blank out of hardenable steel sheet;
   (b) forming said blank to form the cranked mounting part;
   (c) cutting out a mounting opening;
   (d) stacking a plurality of blanks produced according to steps (a) to (c) and clamping in a fixture;
   (e) heating said stack for austenization and quenching thereafter, to harden said blanks; and
   (f) finish-machining said saw blades to provide saw teeth at their outer edges.

2. The method of claim 1, further comprising the step of annealing after quenching.

3. The method of claim 1, wherein step (d) further comprises inserting washers between adjacent pairs of blanks.

4. The method of claim 1, in which a recrystallization annealing of said blanks is begun at the latest within 24 hours after step (b) has been performed.

5. The method of claim 2, in which said blanks are treated according to step (e) and are annealed after quenching while being stacked and clamped together in a fixture.

6. The method of claim 1, in which step (c) also comprises rough-machining of said blanks on their outer edges.

7. The method of claim 1, in which forming is done according to step (b) by one procedure formed by the group comprising deep-drawing, pressing, bending, and hydraulic forming.

8. The method of claim 1, in which said blanks are heated for forming.

9. The method of claim 1, in which said blanks are cut out of a steel sheet of a rapid machining steel.

10. The method of claim 1, in which said blanks are cut out of a sheet comprising 0.8 to 0.95 wt.-% C, 3.8 to 4.7 wt.-% Cr, 4.5 to 5.5 wt.-% Mo, 1.7 to 2.1 wt.-% V, 5.8 to 7 wt.-% W, the reminder being Fe.

11. The method of claim 9, in which step (e) comprises recrystallization, for 1.5 to 2.5 hours at a temperature of 600 to 700° C.

12. The method of claim 9, in which step (e) comprises an austenization for 3 to 5 minutes at a temperature between 1020 and 1080° C.

13. method of claim 9, comprising a first annealing at the secondary hardening maximum of said rapid machining steel for 1.5 to 2.5 hours at a temperature of 530 to 630° C., further comprising a second annealing to a desired working hardness for 1.5 to 2.5 hours at a temperature range of 530 to 630° C., and further comprising a third annealing for relaxing for 40 to 80 minutes at 400 to 500° C.

14. The method of claim 1, in which the heat treatment at least according to step (e) is performed under a forming gas.

15. The method of claim 1, in which said saw blades are surface-ground on their two outer surfaces.

16. The method of claim 1, in which said blanks are cut out of a plate with a thickness of about 0.7 to 1.5 mm.

* * * * *